United States Patent
Sugamata

(10) Patent No.: US 10,732,481 B2
(45) Date of Patent: Aug. 4, 2020

(54) OPTICAL MODULATOR AND OPTICAL TRANSMISSION DEVICE USING SAME

(71) Applicant: Sumitomo Osaka Cement Co., Ltd, Tokyo (JP)

(72) Inventor: Toru Sugamata, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 16/073,965

(22) PCT Filed: Aug. 30, 2016

(86) PCT No.: PCT/JP2016/075313
§ 371 (c)(1),
(2) Date: Jul. 30, 2018

(87) PCT Pub. No.: WO2017/130450
PCT Pub. Date: Aug. 3, 2017

(65) Prior Publication Data
US 2019/0041717 A1 Feb. 7, 2019

(30) Foreign Application Priority Data
Jan. 28, 2016 (JP) .................. 2016-014087

(51) Int. Cl.
*G02B 6/42* (2006.01)
*G02F 1/225* (2006.01)
(Continued)

(52) U.S. Cl.
CPC .......... *G02F 1/2257* (2013.01); *G02B 6/241* (2013.01); *G02B 6/4256* (2013.01);
(Continued)

(58) Field of Classification Search
None
See application file for complete search history.

(56) References Cited

U.S. PATENT DOCUMENTS

2002/0048421 A1* 4/2002 Miyazaki ............. G02F 1/0102
385/1
2009/0290828 A1* 11/2009 Shimizu ............... G02F 1/0327
385/2
(Continued)

FOREIGN PATENT DOCUMENTS

| JP | 2005-128440 A | 5/2005 |
| JP | 2007-065247 A | 3/2007 |

(Continued)

OTHER PUBLICATIONS

International Search Report for PCT/JP2016/075313 dated Nov. 29, 2016.

*Primary Examiner* — Charlie Y Peng
(74) *Attorney, Agent, or Firm* — IpHorgan Ltd.

(57) ABSTRACT

To provide a highly-reliable low-cost small optical modulator in which temperature drift is suppressed and an optical transmission device using the same. An optical modulator including an optical waveguide substrate 1 on which an optical waveguide is formed, a signal electrode which is provided on the optical waveguide substrate and applies an electric field to the optical waveguide, a termination substrate 3 provided with a termination resistor that terminates the signal electrode, and a housing 6 in which the optical waveguide substrate and the termination substrate are mounted, in which, in order to suppress conduction of heat generated from the termination resistor to the optical waveguide substrate through the housing, a groove 8 is formed in the housing 6 between the termination substrate 3 and the optical waveguide substrate 1.

8 Claims, 8 Drawing Sheets

(51) Int. Cl.
  *G02B 6/24* (2006.01)
  *G02F 1/035* (2006.01)
  *G02F 1/21* (2006.01)

(52) U.S. Cl.
  CPC ......... *G02B 6/4266* (2013.01); *G02F 1/0356* (2013.01); *G02F 2001/212* (2013.01)

(56) References Cited

U.S. PATENT DOCUMENTS

| | | | |
|---|---|---|---|
| 2010/0247021 A1* | 9/2010 | Cunningham | G02F 1/025 385/1 |
| 2015/0219935 A1* | 8/2015 | Guzzon | G02F 1/025 385/3 |
| 2016/0026063 A1* | 1/2016 | Yagi | G02F 1/2255 385/2 |
| 2016/0334651 A1* | 11/2016 | Sugaya | G02F 1/015 |

FOREIGN PATENT DOCUMENTS

| | | |
|---|---|---|
| JP | 2014-199302 A | 10/2014 |
| JP | 2015-069162 A | 4/2015 |
| WO | 03005091 A2 | 1/2003 |

\* cited by examiner

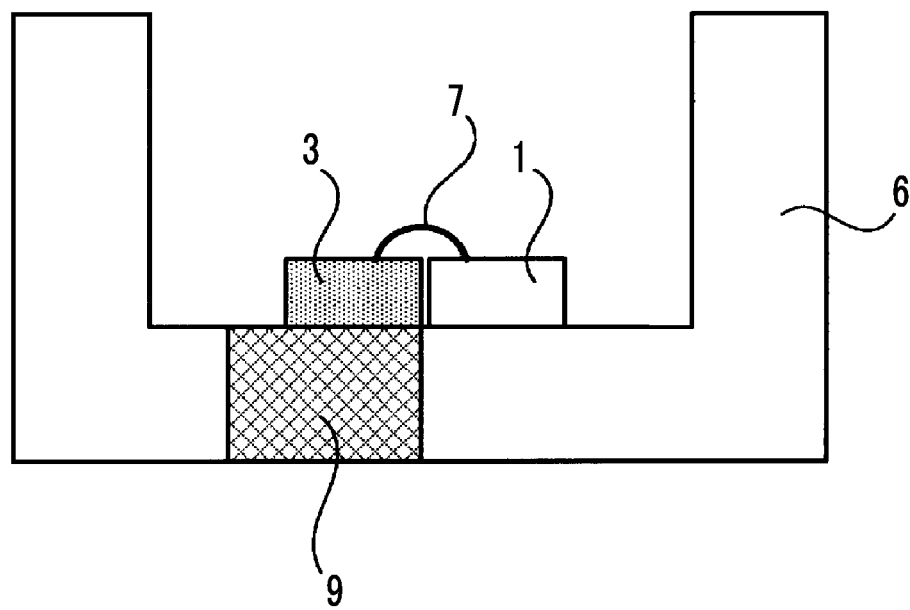
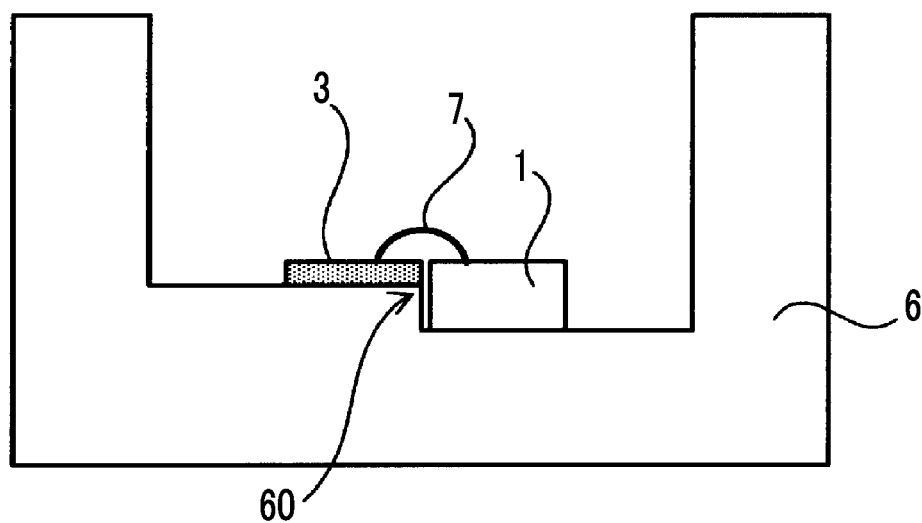

OPTICAL MODULATOR AND OPTICAL TRANSMISSION DEVICE USING SAME

TECHNICAL FIELD

The present invention relates to an optical modulator and an optical transmission device using the same and particularly to an optical modulator including a termination substrate and an optical transmission device using the same.

BACKGROUND ART

Recently, in high-frequency/high-capacity optical fiber communication systems, an optical modulator for which an optical waveguide-formed substrate is used and an optical transmission device into which an optical modulator as described above is combined are frequently used. Among them, optical modulators in which $LiNbO_3$ (referred to as "LN") having an electro-optic effect is used in a substrate are more broadly used in high-frequency/high-capacity optical fiber communication systems compared with modulators of a semiconductor-based material such as InP, Si, or GaAs. In an optical modulator for which this LN is used, an optical waveguide that guides light to the LN substrate in a confined manner is provided, and furthermore, electrodes that apply an electric field to the optical waveguide are formed. In addition, in the electrodes, an RF electrode portion that applies high-frequency signals, a DC electrode portion that applies low-frequency signals or DC voltages, and the like are formed.

Regarding the modulation form of optical modulators for high-frequency/high-capacity optical fiber communication systems, in response to the recent trend of an increase in the transmission capacity, multilevel modulation or transmission formats achieved by incorporating polarization multiplexing into multilevel modulation such as Quadrature Phase Shift Keying (QPSK) or Dual Polarization-Quadrature Phase Shift Keying (DP-QPSK) in which phase modulation is used has become mainstream, replacing On-Off keying or the like of the related art. Furthermore, it has been also proposed to form multiple elements using a plurality of DP-QPSK chips and further increase the transmission capacity (for example, refer to Patent Literature No. 1).

As illustrated in FIG. 1, in a DP-QPSK optical modulator, an optical waveguide (not illustrated) in which two nest-type optical waveguides including two Mach-Zehnder type optical waveguides are disposed is formed on a substrate (optical waveguide substrate) 1 of LN or the like. Furthermore, a plurality of signal electrodes 2 is provided on the substrate 1 in order to apply modulation signals to a modulation portion that the respective Mach-Zehnder type optical waveguides constitute. To each of the signal electrodes 2, modulation signals are input through a connector for electrical signal input 4. In addition, to a termination of the signal electrode 2, a termination resistor 5 is connected. In a case in which the termination resistor 5 is provided to each of the signal electrodes, there are cases in which a plurality of the termination resistors 5 is provided on the same termination substrate 3 as illustrated in FIG. 1, thereby reducing the size of the optical modulator. The substrate (optical waveguide substrate) 1 of LN or the like and the termination substrate 3 are disposed in a housing 6 and thus form a package.

In order to operate the optical modulator at a high frequency, a travelling wave-type electrode constitution in which electrical signals being input propagate through the signal electrodes is used. Signal frequencies being input to the signal electrodes are high-frequency signals in the microwave waveband, almost all of the input electrical energy is consumed in the termination resistors 5 and converted to heat in the termination resistors.

In the DP-QPSK optical modulator, four modulation portions are provided. In order to deal with the phase modulation form with the present constitution, the optical modulator is driven at a voltage magnitude being twice (an electric power being four times) as large as that of the on-off keying form of a single modulator structure of the related art. Therefore, the electric power being consumed in the modulator becomes 16 times or more as large as that consumed in a modulator having the single modulator structure of the related art. Furthermore, in order to meet a requirement of the size reduction of optical modulators, it is necessary to dispose the termination substrate 3 close to the optical waveguide substrate 1, which creates a significant problem attributed to heat being generated from the termination substrate.

Furthermore, in the case of forming multiple elements which intends to increase the transmission capacity by combining two or more DP-QPSK optical modulator constitutions into the same housing as illustrated in FIG. 2, the amount of heat generated becomes 32 times or more as large as that in the on-off keying form of the single modulator structure of the related art. Heat generated from the termination substrate deteriorates the temperature drift of the optical modulator. In addition, the generation of heat from the termination resistor causes the deterioration of the termination resistors over time or the occurrence of cracking, peeling, or the like and creates a serious problem of impairing the reliability of the optical modulator and optical transmission devices using the same. Meanwhile, in FIG. 2, optical waveguide substrates 1a and 1b are disposed side by side horizontally, but there are cases in which a plurality of optical waveguide substrates is disposed to be laminated together as in Patent Literature No. 1.

The influence of heat generated from the termination substrate has been an underlying problem of almost all of the optical modulators having a travelling wave-type electrode constitution; however, in the related art, this problem has been rarely studied or dealt with. Instead, the influence of heat generated has been misunderstood as a temperature change of an environment in which the optical modulator is placed or the unstability of the optical modulator and has been handled as a problem of the deterioration of the intrinsic characteristics of the optical modulator such as temperature drift.

However, this influence has become particularly significant in (a) an optical modulator in which the amplitude of input electrical signals is large, (b) an optical modulator having a plurality of termination resistors, and (c) an optical modulator in which termination resistors are on the same substrate such as optical modulators having the DP-QPSK constitution. Furthermore, this influence has become more serious as the optical modulator has been reduced in size (d) and has been provided a plurality of elements (multiple elements) (e).

As a countermeasure for alleviating the above-described problem of heat generated from the termination resistors, it has been proposed to increase the area of the termination resistors or provide a heat-conductive hole in the termination substrate as described in Patent Literature No. 2. However, in these constitutions and methods, the termination substrate becomes large, and the manufacturing costs also increase, and thus the applicable usages are limited. Therefore, there has been a desire for a solution which can be applied to a variety of transmission formats and meets the requirement of size reduction or cost reduction. In addition, there is a demand for a highly-reliable optical transmission device in which the temperature drift is suppressed by mounting an optical modulator to which a countermeasure to heat generated is provided.

CITATION LIST

Patent Literature

[Patent Literature No. 1] Japanese Laid-open Patent Publication No. 2015-69162
[Patent Literature No. 2] Japanese Laid-open Patent Publication No. 2014-199302

SUMMARY OF INVENTION

Technical Problem

An object of the present invention is, as described above, to provide an optical modulator in which the influence of heat generated from termination resistors is suppressed and an optical transmission device using the same. Particularly, the object is to suppress the generation of heat from the termination resistors which becomes more significant in optical modulators having a plurality of signal inputs and a plurality of termination resistors such as DP-QPSK optical modulators. Furthermore, the object is to provide an optical modulator which satisfies size reduction, the formation of multiple elements, and cost reduction by providing an effective countermeasure to heat generated and an optical transmission device using the same.

Solution to Problem

In order to achieve the above-described object, an optical modulator of the present invention and an optical transmission device using the same have technical characteristics as described below.

(1) An optical modulator including an optical waveguide substrate on which an optical waveguide is formed, a signal electrode which is provided on the optical waveguide substrate and applies an electric field to the optical waveguide, a termination substrate provided with a termination resistor that terminates the signal electrode, and a housing in which the optical waveguide substrate and the termination substrate are mounted, in which, in order to suppress conduction of heat generated from the termination resistor to the optical waveguide substrate through the housing, a groove is formed in the housing between the termination substrate and the optical waveguide substrate.

(2) An optical modulator including an optical waveguide substrate on which an optical waveguide is formed, a signal electrode which is provided on the optical waveguide substrate and applies an electric field to the optical waveguide, a termination substrate provided with a termination resistor that terminates the signal electrode, and a housing in which the optical waveguide substrate and the termination substrate are mounted, in which, in order to suppress conduction of heat generated from the termination resistor to the optical waveguide substrate through the housing, a highly heat-conductive material is provided in a part of the housing in which the termination substrate is disposed.

(3) The optical modulator according to (2), in which, as the highly heat-conductive material, at least one of complexes of Cu—W, Cu—Mo, and Al—SiC is used.

(4) An optical modulator including an optical waveguide substrate on which an optical waveguide is formed, a signal electrode which is provided on the optical waveguide substrate and applies an electric field to the optical waveguide, a termination substrate provided with a termination resistor that terminates the signal electrode, and a housing in which the optical waveguide substrate and the termination substrate are mounted, in which, in order to suppress conduction of heat generated from the termination resistor to the optical waveguide substrate through the housing, the termination substrate is thinned.

(5) An optical modulator including an optical waveguide substrate on which an optical waveguide is formed, a signal electrode which is provided on the optical waveguide substrate and applies an electric field to the optical waveguide, a termination substrate provided with a termination resistor that terminates the signal electrode, and a housing in which the optical waveguide substrate and the termination substrate are mounted, in which, in order to suppress conduction of heat generated from the termination resistor to the optical waveguide substrate through the housing, a level difference is provided between a mounting surface of the housing on which the termination substrate is mounted and a mounting surface of the housing on which the optical waveguide substrate is mounted.

(6) The optical modulator according to (5), in which the termination substrate is thinned, and the mounting surface of the housing on which the termination substrate is mounted is provided at a location higher than the mounting surface of the housing on which the optical waveguide substrate is mounted.

(7) The optical modulator according to (5), in which the mounting surface of the housing on which the termination substrate is mounted is provided at a location lower than the mounting surface of the housing on which the optical waveguide substrate is mounted.

(8) An optical modulator including an optical waveguide substrate on which an optical waveguide is formed, a signal electrode which is provided on the optical waveguide substrate and applies an electric field to the optical waveguide, a termination substrate provided with a termination resistor that terminates the signal electrode, and a housing in which the optical waveguide substrate and the termination substrate are mounted, in which, in order to suppress conduction of heat generated from the termination resistor to the optical waveguide substrate through the housing, a highly heat-conductive member is installed between the termination substrate and the housing.

(9) The optical modulator according to (8), in which the termination substrate is thinned.

(10) An optical modulator including an optical waveguide substrate on which an optical waveguide is formed, a signal electrode which is provided on the optical waveguide substrate and applies an electric field to the optical waveguide, a termination substrate provided with a termination resistor that terminates the signal electrode, and a housing in which the optical waveguide substrate and the termination substrate are mounted, in which, in order to suppress conduction of heat generated from the termination resistor to the optical waveguide substrate through the housing, a level difference is provided between a mounting surface of the housing on which the termination substrate is mounted and a mounting surface of the housing on which the optical waveguide substrate is mounted, and a part of the termination substrate is disposed so as to protrude from a corner portion of the level difference.

(11) An optical modulator including an optical waveguide substrate on which an optical waveguide is formed, a signal electrode which is provided on the optical waveguide substrate and applies an electric field to the optical waveguide, a termination substrate provided with a termination resistor that terminates the signal electrode, and a housing in which the optical waveguide substrate and the termination substrate are mounted, in which, in order to suppress conduction of heat generated from the termination resistor to the optical waveguide substrate through the housing, a level difference is provided between a mounting surface of the housing on which the termination substrate is mounted and a mounting surface of the housing on which the optical waveguide substrate is mounted, and a groove is formed near the level difference in the housing.

(12) The optical modulator according to (11), in which a part of the termination substrate is disposed so as to protrude from a corner portion of the level difference.

(13) An optical modulator including an optical waveguide substrate on which an optical waveguide is formed, a signal electrode which is provided on the optical waveguide substrate and applies an electric field to the optical waveguide, a termination substrate provided with a termination resistor that terminates the signal electrode, and a housing in which the optical waveguide substrate and the termination substrate are mounted, in which, in order to suppress conduction of heat generated from the termination resistor to the optical waveguide substrate through the housing, a level difference is provided between a mounting surface of the housing on which the termination substrate is mounted and a mounting surface of the housing on which the optical waveguide substrate is mounted, and, in an end portion of the termination substrate, the end portion closest to a corner portion of the level difference is disposed inward from the corner portion of the level difference.

(14) The optical modulator according to any one of (1) to (13), in which at least a part of a bottom surface or a side surface of the termination substrate is fixed to the housing using a heat-conductive adhesive containing an Ag filler.

(15) The optical modulator according to any one of (1) to (14), in which at least two termination resistors are provided in the termination substrate.

(16) The optical modulator according to any one of (1) to (15), in which the optical waveguide substrate includes a material selected from $LiNbO_3$, InP, GaAs, and Si.

(17) An optical transmission device including the optical modulator according to anyone of (1) to (16), a data generation portion that generates data signals that are applied to the optical modulator, and a light source that inputs light waves to the optical modulator.

Advantageous Effects of Invention

The present invention enables the effective emission of heat being generated from the termination resistor toward the housing side and, furthermore, the suppression of the heat emitted to the housing being conducted toward the optical transmission device side that fixes the housing and thus conducted to the optical waveguide substrate through the housing, and thus it becomes possible to reduce the influence of the heat on the optical waveguide substrate. Therefore, it is possible to provide a highly-reliable low-cost small optical modulator in which temperature drift is suppressed. In addition, it also becomes possible to provide an optical transmission device in which temperature drift is highly reliably suppressed by mounting the optical modulator of the present invention in the optical transmission device.

BRIEF DESCRIPTION OF DRAWINGS

FIG. 5 is a cross-sectional view illustrating a second example according to the optical modulator of the present invention.

FIG. 6 is a cross-sectional view illustrating a third example according to the optical modulator of the present invention.

DESCRIPTION OF EMBODIMENTS

Hereinafter, an optical modulator according to an aspect of the present invention will be described in detail using FIGS. 3 to 14.

Figure 1:
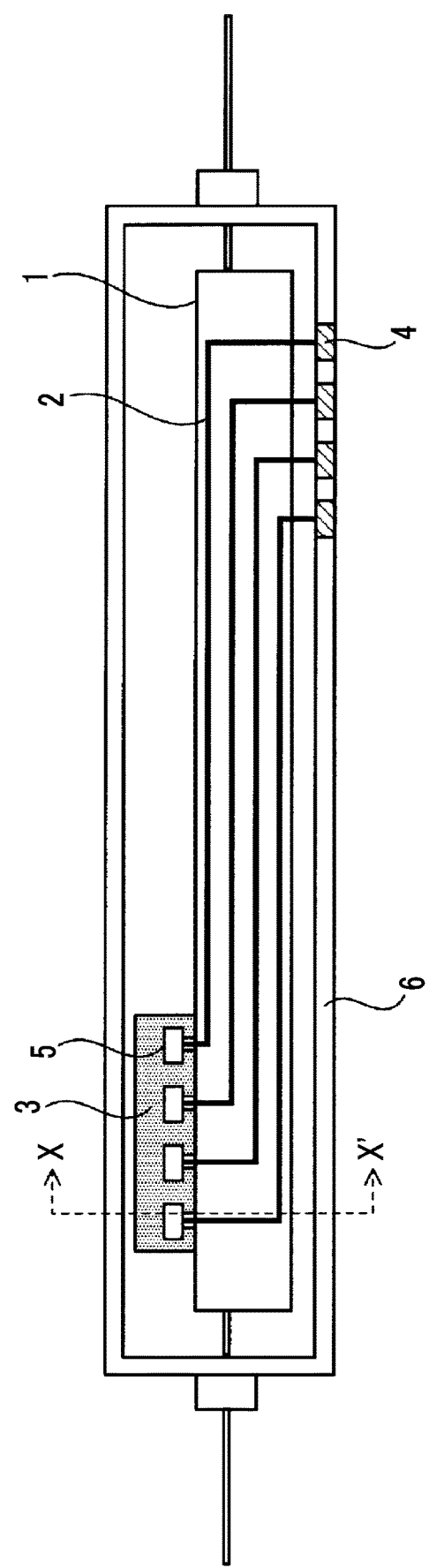
FIG. 1 is a plan view illustrating an example of a DP-QPSK optical modulator.
Figure 2:
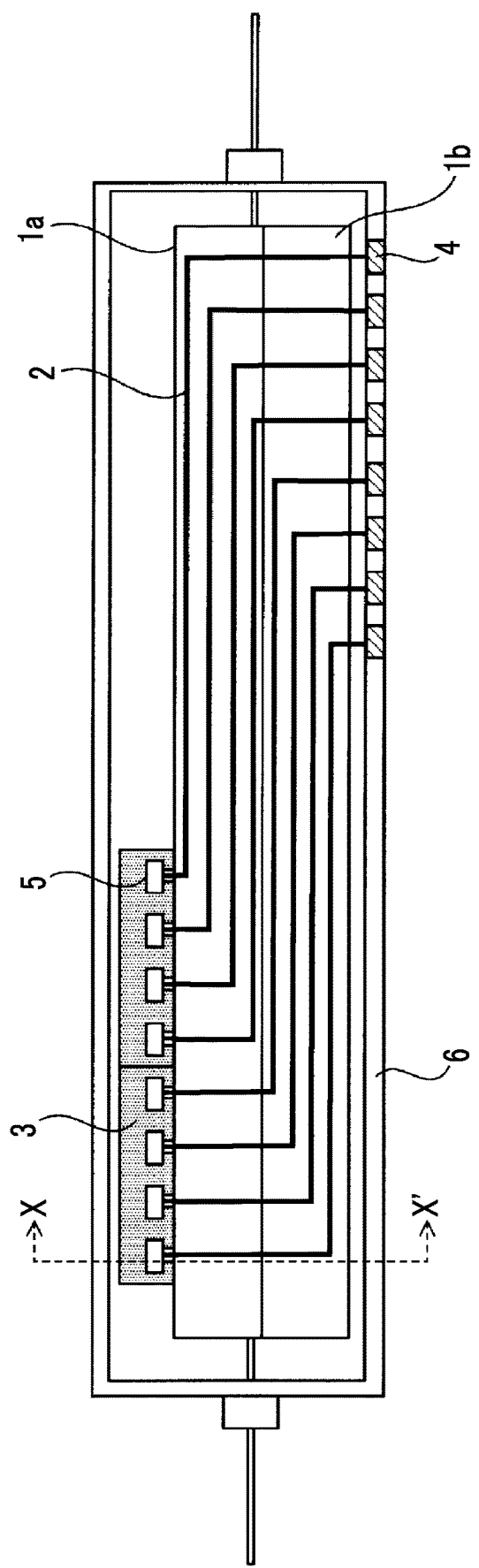
FIG. 2 is a plan view illustrating an example in which two DP-QPSK optical modulators are mounted.
Figure 3:
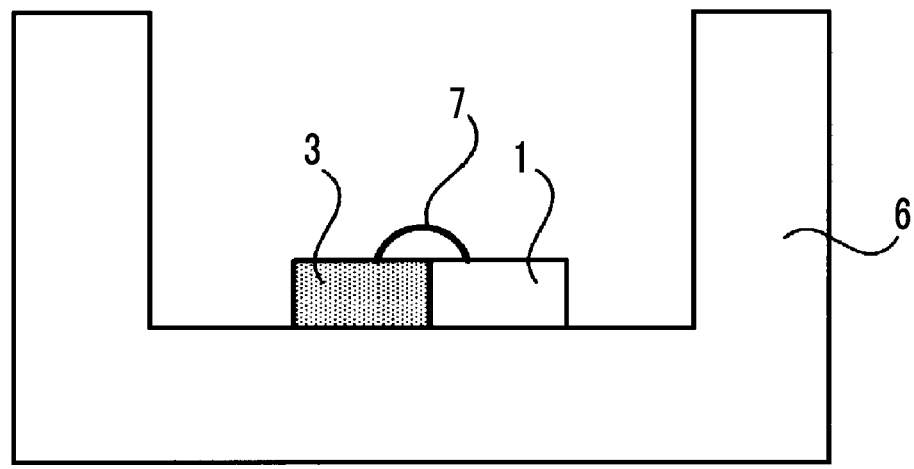
FIG. 3 is a cross-sectional view in an X-X' direction in FIG. 1 or FIG. 2 and a view illustrating an example of an optical modulator of the related art.

FIG. 3 is a cross-sectional view in an X-X' direction in FIG. 1 or FIG. 2 and a cross-sectional view of a constitution example of the related art illustrating a state of an optical waveguide substrate 1 and a termination resistor substrate 3 mounted. As the optical waveguide substrate 1, there is an optical waveguide substrate for which a dielectric body such as $LiNbO_3$ or $LiTaO_3$ or a semiconductor such as InP or Si is used. In the optical modulator of the present invention, the material of the optical waveguide substrate is not particularly limited, and a substrate of a well-known dielectric body or semiconductor of the related art can be used. In addition, in the formation of an optical waveguide, it is possible to use a well-known technique such as a method of forming an optical waveguide by thermally diffusing Ti into a dielectric body substrate of $LiNbO_3$, a ridge-type optical waveguide, or the like.

As the constitution of the optical waveguide, it is possible to use a variety of shapes of an optical waveguide such as a single Mach-Zehnder type optical waveguide, a so-called nest-type optical waveguide in which two Mach-Zehnder type optical waveguides are disposed in a nest form, and furthermore, an optical waveguide in which two nest-type optical waveguides including two Mach-Zehnder type optical waveguides are disposed like the DP-QPSK optical modulator also disclosed by Patent Literature No. 1.

In addition, regarding the number of signal electrodes that apply input electrical signals to a modulation portion of the optical waveguide, the present invention is not limited to a DP-QPSK optical modulator including four signal electrodes as illustrated in FIG. 1, and can be applied to a variety of optical modulators such as a single-type optical modulator (one signal electrode for modulation), a dual-type optical modulator (two signal electrodes for modulation), and a DQPSK constitution modulator (two signal electrodes for modulation). Particularly, as the number of signal electrodes increases, the present invention can be more effectively applied and, for example, the present invention can be particularly effectively applied to a multiple element constitution in which two DP-QPSK optical modulators are combined together and eight input electrical signals are provided as illustrated in FIG. 2.

As illustrated in an example of the related art of FIG. 3 as well, the termination substrate 3 may be disposed in a state in which the termination substrate is as close to the optical waveguide substrate 1 as possible so as to prevent the deterioration of the reflection and transmission characteristics of high-frequency signals being input so that the heights of the top surfaces substantially match each other with no level differences. Therefore, in the related art, for a surface of a housing 6 on which the termination substrate 3 and the optical waveguide substrate 1 are mounted, a flat constitution as illustrated in FIG. 3 has been employed unless there is a particular request from the viewpoint of the ease of mounting the substrates and elements or the ease of working the housing. In addition, generally, a wire of the termination substrate 3 and a wire of the optical waveguide substrate are connected by a Au bonding or the like as indicated by a reference sign 7 so that input electrical signals propagate to the termination substrate 3 as efficiently as possible.

The element number of termination resistors that are formed on the termination substrate 3 is appropriately selected depending on the constitution of the optical modulator, the electrode design, and the housing design. In the optical modulator having the DP-QPSK constitution of FIG. 1, an example of four termination resistors formed on the same termination substrate is illustrated, but it is also possible to constitute the optical modulator using a plurality of termination substrates. Furthermore, it is also possible to constitute the four termination resistors in FIG. 1 as electric circuits for termination including one or two termination resistors and form these electric circuits on the same substrate. Recently, in order to reduce the size of the optical modulator, there have been many cases in which a plurality of termination resistors is formed on the same substrate. The present invention can be effectively applied to an optical modulator in which two or more termination resistors are used as illustrated in FIG. 1 or FIG. 2, particularly, a case in which a plurality of termination resistors is disposed on the same termination substrate.

Figure 4:
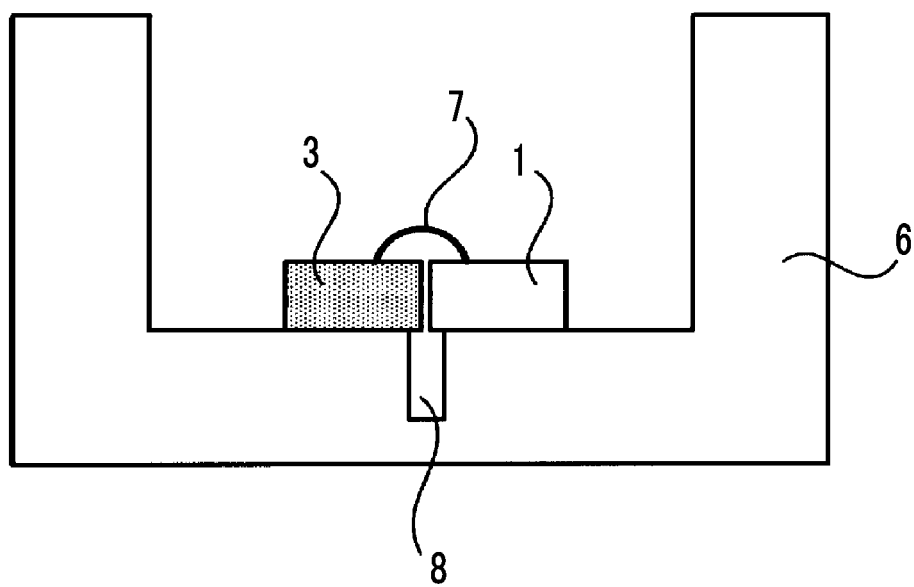
FIG. 4 is a cross-sectional view illustrating a first example according to an optical modulator of the present invention.

FIG. 4 is a cross-sectional view illustrating a first example of the optical modulator of the present invention. Similar to FIG. 3, FIG. 4 corresponds to a cross-sectional view in the X-X' direction in FIG. 1 or FIG. 2.

In the present example, a groove 8 is formed in the housing 6 between the termination substrate 3 and the optical waveguide substrate 1, thereby forming a constitution in which the conduction of heat generated from the termination substrate through the housing and the consequent influence on the optical waveguide substrate are suppressed.

Generally, the housing is selected from metallic materials such as SUS or Kovar in consideration of cutting workability or an assembly step such as laser welding or sealing. These metallic materials have a more highly heat-conductive property than the termination substrate and the like, and heat generated from the termination resistors is conducted to the optical waveguide substrate through the metal housing 6. In order to reduce and suppress this influence, the groove 8 is formed in a part of the housing.

As the width of the groove (the width of the groove 8 in FIG. 4 in the horizontal direction) increases, the influence of termination heat generation can be further suppressed; however, in order to increase the housing stiffness in spite of a small size and prevent the groove from influencing the mounting of the optical waveguide substrate and the termination substrate, the width may be set to approximately 0.1 mm to 1 mm. In addition, as the depth of the groove increases, the influence of heat generated from the termination resistors can be further suppressed; however, due to the limitation on the housing thickness, the depth may be set in a range of approximately 0.5 mm to 2 mm.

FIG. 5 is a view illustrating a second example of the optical modulator of the present invention.

In the present example, a highly heat-conductive material 9 is provided in the surface of the housing 6 on which the termination substrate 3 is mounted. The highly heat-conductive material refers to a material having a higher heat-conductive property than the housing material, and, more specifically, Cu—W, Cu—Mo, and Al—SiC complexes having a higher heat-conductive property than SUS or Kovar are selected.

This highly heat-conductive material 9 is installed below the termination substrate 3 so as to more effectively and more selectively emit heat generated from the termination substrate to the outside of the housing and may be formed so as to reach the outside of the housing. The above-described constitution is formed by, first, forming a penetration portion in a part of the housing and then fixing a highly heat-conductive material having substantially the same shape as that of the penetration portion using silver brazing, gold tin, or the like. Meanwhile, in order to enhance the air tightness in the housing, it is also possible to form a constitution in which a recess portion is provided in an inside bottom surface or the like without completely penetrating the housing and the highly heat-conductive material is disposed in the recess portion.

FIG. 6 is a view illustrating a third example of the optical modulator of the present invention.

In the present invention, the thickness of the termination substrate 3 is decreased (thinned) in the example. As the material that is used for the termination substrate, ceramic materials such as alumina having excellent high-frequency characteristics are frequently used since the termination substrate is used at high frequencies such as the microwave waveband. Generally, these ceramic materials have a poorer heat-conductive property than metallic materials, and thus it is effective to thin the termination substrate in order to efficiently transfer heat generated from the termination substrate to the outside of the substrate.

The thickness of the thinned termination substrate 3 needs to be selected in comprehensive consideration of the strength, heat-conductive property, size, and the like of the material used for the termination substrate and may be thinner than the thickness (generally, 0.5 mm to 2.0 mm) of a chip in which at least an optical waveguide is formed and which is installed beside the termination substrate. When the emission of heat generated from the termination resistors is taken into account, it is advantageous to decrease the thickness; however, when the mechanical strength or the impedance design of the termination resistors is taken into account, the thickness is preferably set in a range from 0.05 mm to 0.8 mm.

Heat generated from the termination resistors is efficiently conducted toward the housing since the termination substrate is formed thin. Therefore, the termination resistors becoming hot is suppressed, and it is possible to solve reliability problems such as the deterioration of the termination resistors over time or cracking, peeling, or the like. In addition, the thickness of the housing on which the termination substrate is mounted is set to be thicker than that of a portion on which the optical waveguide substrate is mounted as illustrated in FIG. 6, and thus it becomes easy to diffuse heat toward the thick portion of the housing, and it is also possible to effectively reduce the temperature drift of the optical modulator.

A level difference 60 provided in the mounting surface of the termination substrate and the optical waveguide substrate as in the present example creates an asymmetry of heat conduction, and this level difference constitution alone has an action of reducing the influence of the conduction of heat generated from the termination resistors to the optical waveguide substrate.

Figure 7:
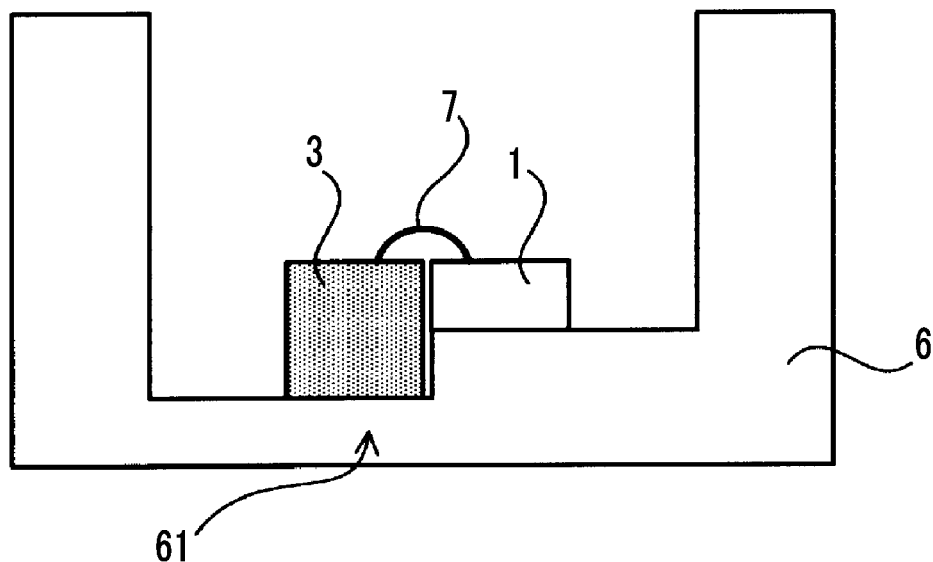
FIG. 7 is a cross-sectional view illustrating a fourth example according to the optical modulator of the present invention.

FIG. 7 is a view illustrating a fourth example of the optical modulator of the present invention.

In the present invention, the thickness of a bottom surface (refer to a reference sign 61) of the housing 6 on which the termination substrate 3 is mounted is set to be thin in the example. In this example, the thickness of a bottom surface 61 of the housing 6 located below the termination substrate generating heat is thinned in order to efficiently emit heat generated from the termination substrate to the outside of the housing, thereby forming a constitution in which heat is efficiently emitted to a structure of an optical transmission device that fixes the housing 6.

As the thickness of this portion decreases, heat can be more efficiently emitted to the outside; however, due to the limitations of the housing stiffness maintained at a certain level and the thickness of the housing, and the like, the thickness may be set in a range of approximately 0.2 mm to 2 mm. In this case as well, a level difference is formed in the mounting surface of the termination substrate 3 and the optical waveguide substrate 1. Since the heights of the top surfaces of the two substrates are matched each other, and thus the thickness of the termination substrate may be set to be thick as in FIG. 7 or the thickness of the optical waveguide substrate may be set to be thin while keeping the thickness of the termination substrate unchanged.

Figure 8:
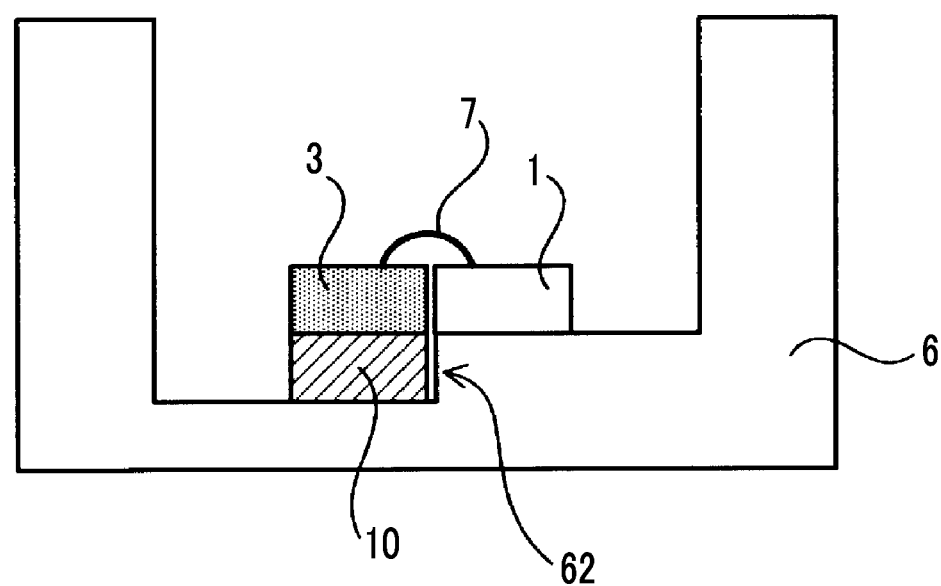
FIG. 8 is a cross-sectional view illustrating a fifth example according to the optical modulator of the present invention.

FIG. 8 is a view illustrating a fifth example of the optical modulator of the present invention.

In the present example, in addition to the constitution of FIG. 7, a highly heat-conductive material 10 is provided below the termination substrate 3. In the present constitution, a constitution in which the conduction of heat generated from the termination substrate to the housing from the termination substrate is efficiently accelerated using a highly heat-conductive body is employed. In the example of FIG. 8, a constitution example in which the thickness of the termination substrate remains unchanged and a highly heat-conductive body as thick as the thinned thickness of the housing is provided is illustrated, but a constitution in which the termination substrate is further thinned and the highly heat-conductive body is provided becomes a more preferred example. The material of the highly heat-conductive body, the thinned thickness, and the like are as described above.

Figure 9:
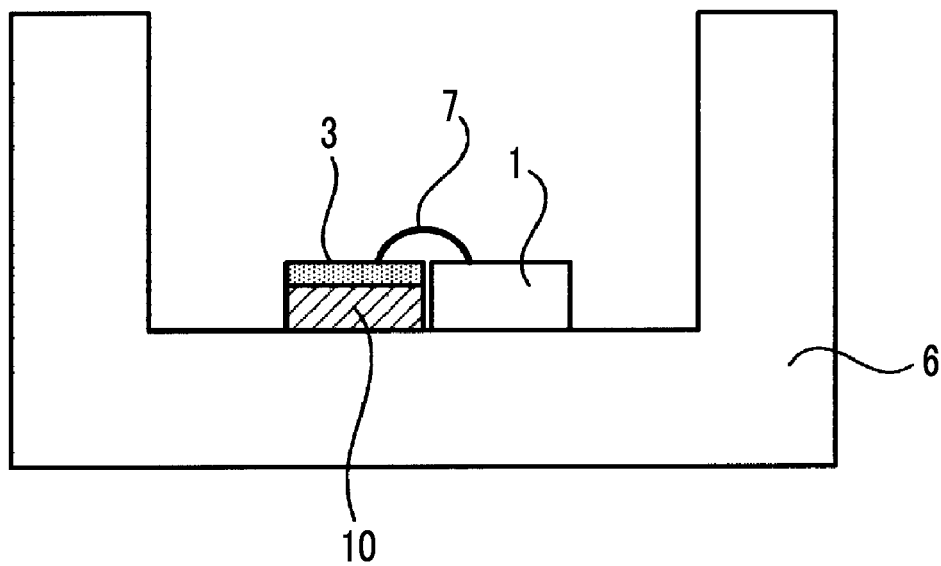
FIG. 9 is a cross-sectional view illustrating a sixth example according to the optical modulator of the present invention.

FIG. 9 is a view illustrating a sixth example of the optical modulator of the present invention.

A constitution of the present example is a constitution in which no level difference is provided in the housing as in the example of the related art in contrast to the constitution illustrated in FIG. 8 in which the level difference is provided in the mounting surface of the termination substrate and the optical waveguide substrate. In this constitution, the termination substrate 3 is thinned, and the highly heat-conductive material 10 is installed, whereby it is possible to realize both the suppression of the influence of heat generation to a certain extent and the provision of both the ease of mounting the termination substrate and the optical waveguide substrate and the ease of manufacturing the housing.

Figure 10:
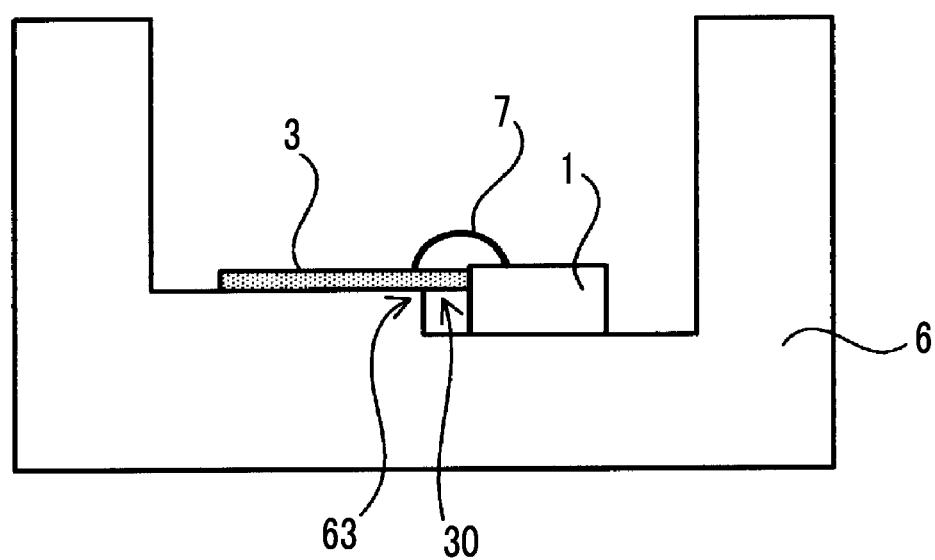
FIG. 10 is a cross-sectional view illustrating a seventh example according to the optical modulator of the present invention.

FIG. 10 is a view illustrating a seventh example of the optical modulator of the present invention.

In the example of the present invention, the termination substrate 3 is thinned, and a part 30 of the termination substrate 3 protrudes from a mounting surface 63. In this constitution, heat is efficiently conducted to the metal housing 6 from the termination substrate 3 generating heat and, due to the constitution in which the part of the termination substrate protrudes, a space in proportion to the level difference in the housing and the protrusion degree of the termination substrate 3 is formed between the termination substrate and the optical waveguide substrate, and thus the influence of thermal conduction through the housing is further suppressed.

As the protrusion degree increases, the effect of suppressing the heat influence becomes stronger, realistically, it is necessary to consider the mounting property of the termination substrate or the influence on Au bonding, but the protrusion degree has a wide range of choice and is set in a range of approximately 10 µm to 2 mm. Even in the constitution in which the part of the termination substrate 3 protrudes as described above, the top surface of the termination substrate 3 and the top surface of the optical waveguide substrate 1 have substantially the same height, and furthermore, in a case in which the gap between the termination substrate and the optical waveguide substrate is narrow, it is possible to avoid the high-frequency characteristics being sacrificed. The gap between both substrates in this case may be set to 100 µm or less.

Figure 11:
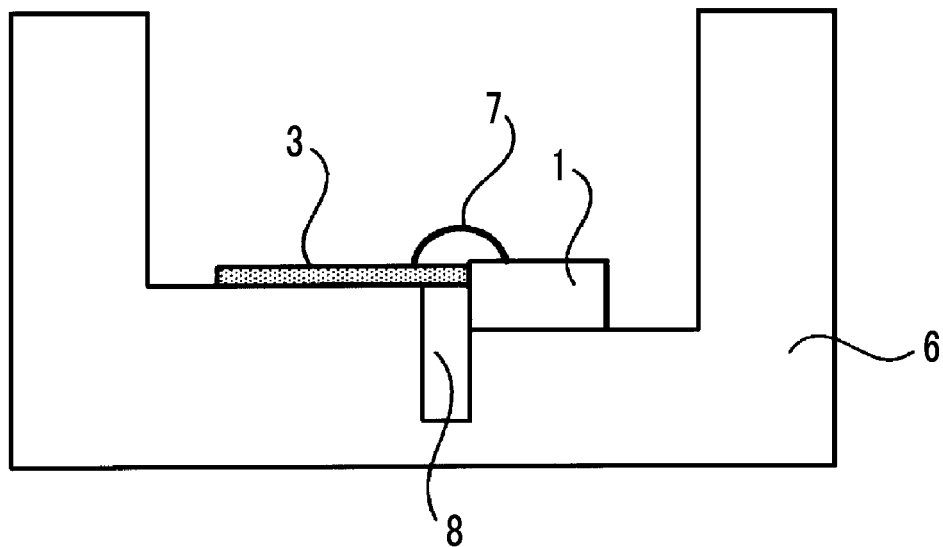
FIG. 11 is a cross-sectional view illustrating an eighth example according to the optical modulator of the present invention.

FIG. 11 is a view illustrating an eighth example of the optical modulator of the present invention.

In the constitution of the present invention, in addition to the constitution of FIG. 10, furthermore, the groove 8 is formed in the housing, and the influence of heat generated from the termination resistor on the optical waveguide substrate is suppressed. The thickness and the protrusion degree of the termination substrate, the width or depth of the groove, and the like are the same as the above-described contents and thus will not be described again herein. This constitution of FIG. 11 has the strongest effect of suppressing the heat influence among the several examples listed.

Figure 12:
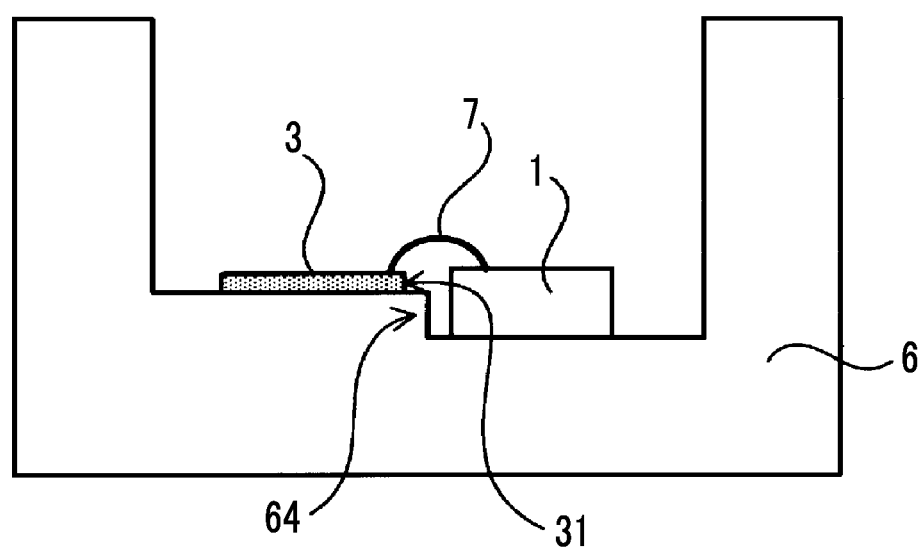
FIG. 12 is a cross-sectional view illustrating a ninth example according to the optical modulator of the present invention.

FIG. 12 is a view illustrating a ninth example of the optical modulator of the present invention.

In the present example, an end portion 31 of the thinned termination substrate 3 is disposed inward from a corner portion 64 of a housing mounting surface provided with a level difference. In this constitution, a large amount of heat generated from the termination substrate 3 is conducted to a housing section located below the termination substrate and only a small amount of the heat is conducted to a portion on which the optical waveguide substrate is mounted. Furthermore, the gap between the termination substrate 3 and the optical waveguide substrate 1 becomes broad, and thus a constitution in which the heat influence can be further reduced is formed.

In addition, the present constitution has an effect of enlarging the mounting tolerance of the termination substrate 3 and also reducing the number of assembly man-hours or suppressing an adverse effect (cracking, chipping, or the like) by the interference with the optical waveguide substrate 1. As the distance from the corner portion 64 of the level difference in the housing to the end portion 31 of the termination substrate increases, the effect of reducing the heat influence becomes stronger; however, when adverse effects on the reflection or transmission characteristics of high-frequency signals are taken into account, the distance may be set in a range of approximately 100 μm.

Figure 13:
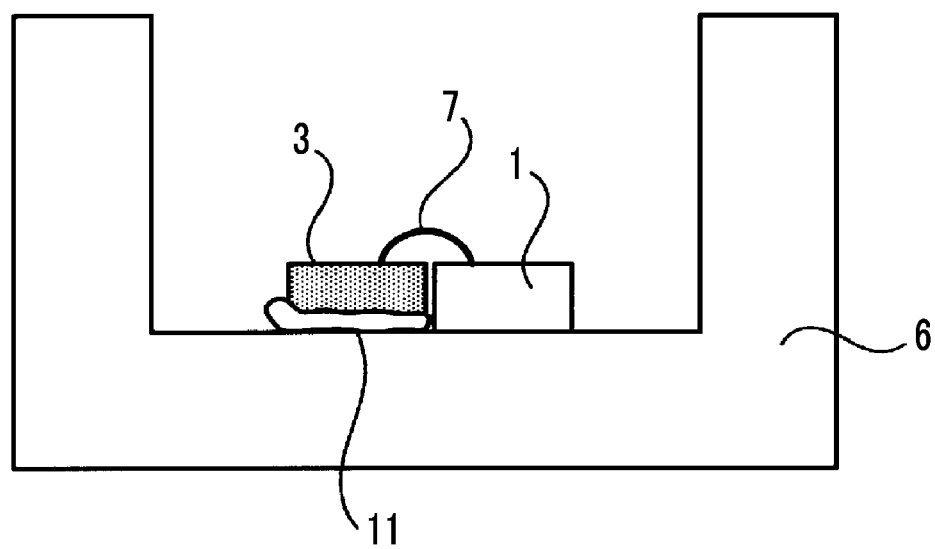
FIG. 13 is a cross-sectional view illustrating a tenth example according to the optical modulator of the present invention.

FIG. 13 is a view illustrating a tenth example of the optical modulator of the present invention.

In the present example, a bottom surface or a side surface of the termination substrate 3 generating heat is fixed using a heat-conductive adhesive 11 containing an Ag filler. Compared with ordinary adhesives, the heat-conductive adhesive containing an Ag filler has a viscosity that is more easily adjusted and is more easily cured, enables the termination substrate 3 to be mounted on the housing 6 with a higher accuracy and a more favorable workability, and is also capable of stabilizing the high-frequency characteristics due to its high electric conductive property. In addition, when the heat-conductive adhesive containing an Ag filler is used in both the bottom surface and the side surface of the termination substrate, it becomes possible to more efficiently conduct heat generated from the termination substrate. Furthermore, the adhesive containing an Ag filler also have a variety of advantages so that the heat-conductive adhesive is easily formed thick and high on the side surface of the termination substrate in order particularly to efficiently conduct heat in the housing from the side surface of the termination substrate.

When the constitutions of the present invention as described above are employed, the mounting workability of the termination substrate significantly improves, and, at the same time, it is possible to provide an optical modulator which has excellent high-frequency characteristics and in which termination heat generation is effectively reduced.

Figure 14:
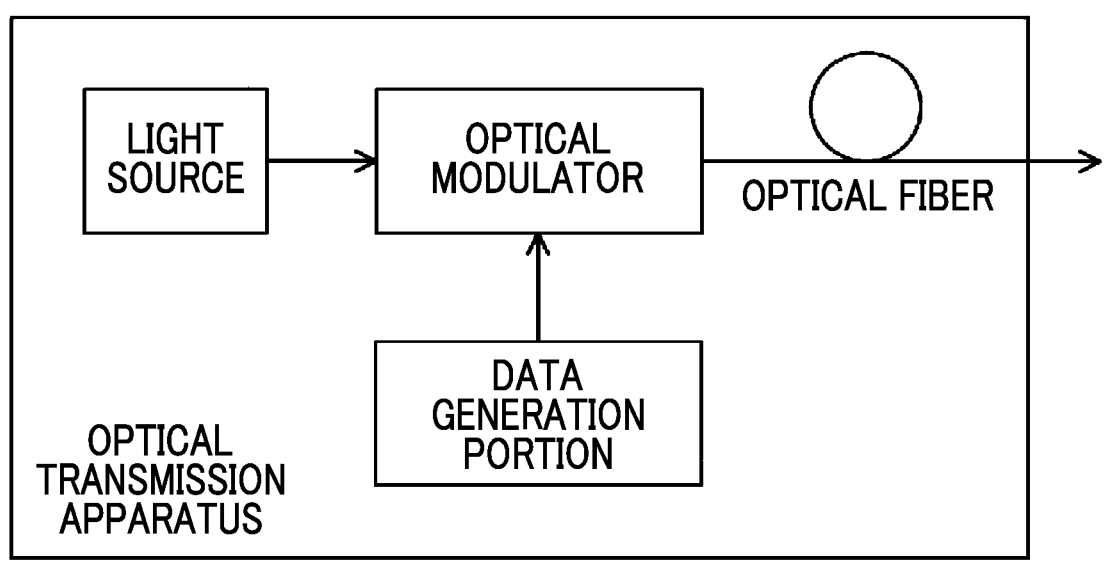
FIG. 14 is a view illustrating an example in which the optical modulator of the present invention is combined into an optical transmission device.

FIG. 14 is a constitution example of an optical transmission device in which the optical modulator of the present invention is mounted.

A basic constitution of the optical transmission device includes a light source that generates light waves that are introduced into the optical modulator, the optical modulator, a data generation portion that applies signals to the optical modulator, and an optical fiber for guiding modulated light generated from the optical modulator to the outside.

When the optical transmission device begins to be driven, temperature drift occurs in the optical modulator. In order to stabilize the transmission characteristics with a high quality, it becomes necessary to operate the optical modulator while controlling the optical modulator so as to hold the operation point of the optical modulator in an appropriate state. In the related art, this temperature drift has been considered as the influence of heat generation in peripheral devices of the optical modulator such as the light source or the data generation portion.

However, in DP-QPSK optical modulators, small optical modulators, and the like, there are cases in which large temperature drift occurs immediately after the beginning of the driving of an optical transmission device and the transmission characteristics of the optical transmission device become significantly unstable. As a result of the present inventors' intensive studies regarding the causes, it has been clarified that the causes cannot be explained with heat generation in peripheral devices or changes in ambient temperatures which have been considered as the causes in the related art. In addition, the present inventors found that the generation of heat from termination resistors in the optical modulator has an influence and found that the temperature drift is a phenomenon that occurs particularly significantly, particularly, in an optical modulator constitution to which a plurality of high-frequency signals is input, in a case in which a plurality of termination resistors is formed on the same substrate, a case in which the amplitude of input signals is large, and furthermore, a case in which optical modulators are small.

Regarding this problem, when the optical modulator provided by the present invention is disposed in the optical transmission device, it is possible to reduce temperature drift caused by the generation of heat from the termination resistors and stabilize the transmission characteristics with a high quality.

The above-described examples are not limited to the constitution of DP-QPSK optical modulators in which a LiNbO$_3$ substrate is used, and the present invention can be applied regardless of the modulation form as long as optical modulators have termination resistors, and the generation of heat from the termination resistors have an influence on the characteristics of the optical modulators. In addition, the optical waveguide substrate may be an optical waveguide substrate of a semiconductor-based material such as InP or Si, and it is needless to say that, even in a case in which a LiNbO$_3$ substrate is used, the present invention can be applied regardless of crystal orientations such as Xcut or Zcut.

In addition, in the above-described examples, examples of the termination substrate in which only the termination resistors are formed on the substrate have been described, but capacitors, other electronic components, penetrating conductors, or multilayered electronic circuits may be formed on the termination substrate. In addition, it is needless to say that the termination resistors may be formed a different termination substrate.

INDUSTRIAL APPLICABILITY

As described above, according to the present invention, it is possible to provide a highly-reliable low-cost small optical modulator in which temperature drift is suppressed. In addition, it is possible to provide an optical transmission device in which the optical modulator of the present invention is mounted and temperature drift is highly reliably suppressed.

REFERENCE SIGNS LIST

1: OPTICAL WAVEGUIDE SUBSTRATE
2: SIGNAL ELECTRODE
3: TERMINATION SUBSTRATE
4: CONNECTOR FOR ELECTRICAL SIGNAL INPUT

5: TERMINATION RESISTOR (HEAT GENERATION PORTION)
6: HOUSING
7: ELECTRIC CONNECTION WIRE (Au BONDING)
8: HOUSING SECTION GROOVE
9: HOUSING LEVEL DIFFERENCE
10: HIGHLY HEAT-CONDUCTIVE MATERIAL
11: HEAT-CONDUCTIVE ADHESIVE

The invention claimed is:

1. An optical modulator comprising:
an optical waveguide substrate on which an optical waveguide is formed;
a signal electrode which is provided on the optical waveguide substrate and applies an electric field to the optical waveguide;
a termination substrate provided with a termination resistor that terminates the signal electrode; and
a housing in which the optical waveguide substrate and the termination substrate are mounted,
wherein the thickness of the termination substrate is thinner than the thickness of the optical waveguide substrate,
the thickness of the housing on which the termination substrate is mounted is set to be thicker than that of a portion on which the optical waveguide substrate is mounted, and
the height of the top surface of the termination substrate is approximately the same as the height of the top surface of the optical waveguide substrate.

2. The optical modulator according to claim 1, wherein a level difference is provided between a mounting surface of the housing on which the termination substrate is mounted and a mounting surface of the housing on which the optical waveguide substrate is mounted, and a part of the termination substrate is disposed so as to protrude from a corner portion of the level difference.

3. The optical modulator according to claim 1, wherein a level difference is provided between a mounting surface of the housing on which the termination substrate is mounted and a mounting surface of the housing on which the optical waveguide substrate is mounted, and a groove is formed near the level difference in the housing.

4. The optical modulator according to claim 1, wherein a level difference is provided between a mounting surface of the housing on which the termination substrate is mounted and a mounting surface of the housing on which the optical waveguide substrate is mounted, and, in an end portion of the termination substrate, the end portion closest to a corner portion of the level difference is disposed inward from the corner portion of the level difference.

5. The optical modulator according to any one of claims 1, 2, 3 or 4, wherein at least a part of a bottom surface or a side surface of the termination substrate is fixed to the housing using a heat-conductive adhesive containing an Ag filler.

6. The optical modulator according to any one of claims 1, 2, 3 or 4, wherein at least two termination resistors are provided in the termination substrate.

7. The optical modulator according to any one of claims 1, 2, 3 or 4, wherein the optical waveguide substrate comprises a material selected from $LiNbO_3$, InP, GaAs, and Si.

8. An optical transmission device comprising: the optical modulator according to any one of claims 1, 2, 3 or 4; a data generation portion that generates data signals that are applied to the optical modulator; and a light source that inputs light waves to the optical modulator.

* * * * *